US008399850B2

(12) United States Patent
Lustig et al.

(10) Patent No.: US 8,399,850 B2
(45) Date of Patent: Mar. 19, 2013

(54) SYSTEMS, METHODS, AND APPARATUS FOR ANODE AND CATHODE ELECTRICAL SEPARATION IN DETECTORS

(75) Inventors: James Michael Lustig, Twinsburg, OH (US); Frederick L. Glesius, Twinsburg, OH (US)

(73) Assignee: General Electric Company, Schenectady, NY (US)

( * ) Notice: Subject to any disclaimer, the term of this patent is extended or adjusted under 35 U.S.C. 154(b) by 74 days.

(21) Appl. No.: 12/852,674

(22) Filed: Aug. 9, 2010

(65) Prior Publication Data
US 2012/0032090 A1  Feb. 9, 2012

(51) Int. Cl.
*G01T 3/00* (2006.01)
(52) U.S. Cl. .................................. 250/390.01
(58) Field of Classification Search .............. 250/390.01
See application file for complete search history.

(56) References Cited

U.S. PATENT DOCUMENTS

| 3,787,697 | A | * | 1/1974 | Shields | 250/370.04 |
| 3,903,444 | A | | 9/1975 | Tessler | |
| 4,463,264 | A | * | 7/1984 | Young et al. | 250/390.01 |
| 5,180,917 | A | * | 1/1993 | Wraight | 250/374 |
| 2004/0227094 | A1 | * | 11/2004 | Tompa et al. | 250/370.01 |
| 2006/0138340 | A1 | * | 6/2006 | Ianakiev et al. | 250/390.01 |

OTHER PUBLICATIONS de Vos et al. A copper evaporation method of Geiger-Müller tube construction, The Review of Scientific Instruments, vol. 16, No. 10 (Oct. 1945), pp. 270-272.*

* cited by examiner

*Primary Examiner* — David Porta
*Assistant Examiner* — Shun Lee
(74) *Attorney, Agent, or Firm* — Cooper Legal Group, LLC

(57) ABSTRACT

Certain embodiments of the invention may include systems, methods, and apparatus for providing anode and cathode electrical separation in detectors. According to an example embodiment of the invention, a method is presented for providing a neutron detector tube. The method may include applying a conductive layer to at least a portion of an inner surface of a non-conductive cathode tube associated with a neutron detector; applying a neutron sensitive cathode coating to at least a portion of the conductive layer; sealing a first portion of the neutron detector tube with a cathode cap; and sealing a second portion of the neutron detection tube with an anode cap.

20 Claims, 3 Drawing Sheets

SYSTEMS, METHODS, AND APPARATUS FOR ANODE AND CATHODE ELECTRICAL SEPARATION IN DETECTORS

FIELD OF THE INVENTION

This invention generally relates to anode and cathode electrical separation, and, in particular, to anode and cathode electrical separation in detectors.

BACKGROUND OF THE INVENTION

Certain radioactive materials, including plutonium, emit radiation and/or subatomic particles. Plutonium-239 and Plutonium 240, for example, emit gamma radiation and neutrons from spontaneous fission events. Detecting plutonium can be very challenging, and often requires specialized scientific instruments that are designed to detect neutrons. However, detecting free neutrons can be rather challenging since they do not carry an electrical charge.

Detectors have been made that can indirectly measure emitted free neutrons. For example, charged particles (tritium and protium) are produced when helium 3 absorbs a neutron, and the charged particles can be detected. Neutron detectors utilizing helium-3 have been proposed for detecting smuggled plutonium in shipping containers, but a worldwide shortage of helium-3 has prevented this to some extent. Alternate materials are now being explored to provide a substitute for helium 3.

Neutron detector tubes typically operate with a large voltage potential between a cathode and an anode, and therefore, a means of electrical isolation is usually required between the cathode and anode. The detector tubes are typically sealed to contain a fill gas. Conventional isolation and sealing methods have included ceramic to metal seals, which require tight tolerances and brazing operations that can add significant costs to each tube. Often, the neutron detector tubes are used in arrays consisting of multiple detector tubes, so any costly process or material used in the assembly of each tube can result in a significant expense in the final array.

BRIEF SUMMARY OF THE INVENTION

Some or all of the above needs may be addressed by certain embodiments of the invention. Certain embodiments of the invention may include systems, methods, and apparatus for anode and cathode electrical separation in detectors.

According to an example embodiment of the invention, a method is presented for providing a neutron detector tube. The method may include applying a conductive layer to at least a portion of an inner surface of a non-conductive cathode tube associated with a neutron detector; applying a neutron sensitive cathode coating to at least a portion of the conductive layer; sealing a first portion of the neutron detector tube with a cathode cap; and sealing a second portion of the neutron detection tube with an anode cap.

According to another example embodiment, a system is provided. The system may include a power supply, a pulse detector, and at least one neutron detector tube. The at least one neutron detector tube may include a cathode tube. The cathode tube may include a non-conductive body portion with an inner surface and a conductive layer on at least a portion of the inner surface. The cathode tube may include a neutron sensitive cathode coating in electrical communication with the conductive layer. The cathode tube may include a cathode cap to seal a first portion of the neutron detector tube. The cathode tube may also include an anode cap in communication with the non-conductive body portion of the cathode tube to seal a second portion of the neutron detector tube.

According to another example embodiment, an apparatus is provided. The apparatus may include a cathode tube. The cathode tube may include a non-conductive body portion with an inner surface, and a conductive layer on at least a portion of the inner surface. The cathode tube may include a neutron sensitive cathode coating in electrical communication with the conductive layer. The cathode tube may also include a cathode cap to seal a first portion of the cathode tube. The cathode tube may also include an anode cap in communication with the non-conductive body portion of the cathode tube to seal a second portion of the cathode tube.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
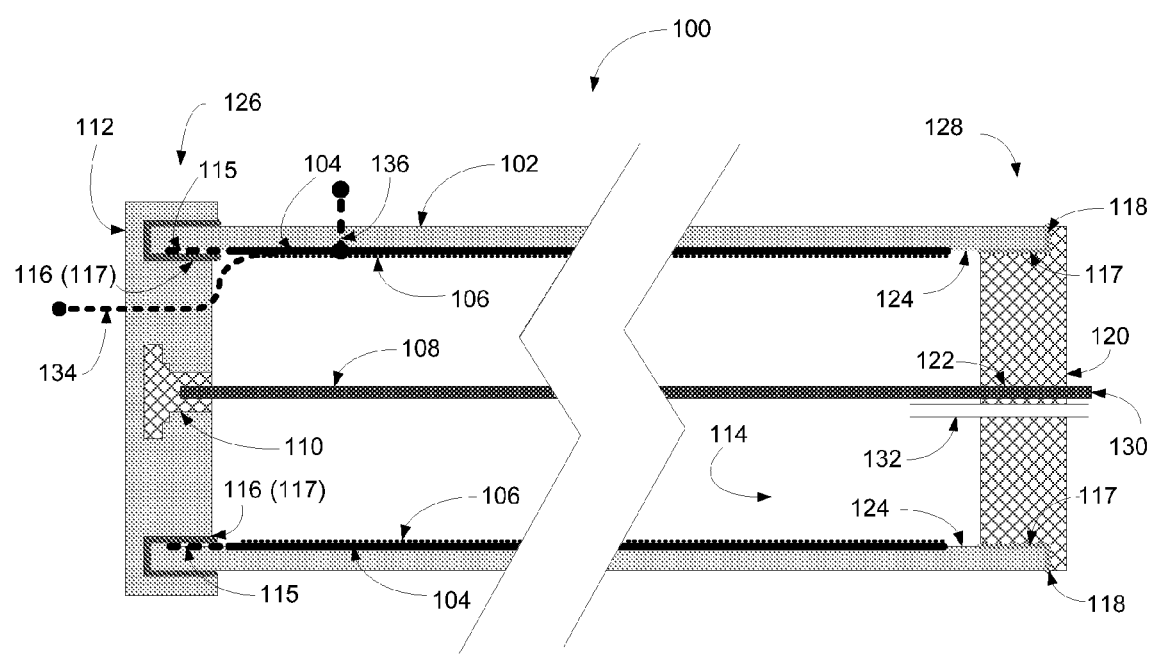
FIG. 1 is a block diagram of an illustrative neutron detector tube according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable electrical insulation between an anode and cathode in a detector. Embodiments of the invention may also provide for more cost effective materials and methods to be used for sealing a detector tube. For example, by using a certain arrangement of materials to prepare a detector tube (including conductive surfaces, sensitive coatings, and non-conductive regions), portions of the cathode body may provide electrical insulation between the cathode and anode and may enable the use of glass-to-glass and/or metal-to-metal seals instead of costly ceramic to metal seals.

Certain example embodiments of the invention may also include neutron sensitive coatings for use in a neutron detector tube. For example, in certain embodiments of the invention, neutron sensitive materials including boron-10, lithium-6, gadolinium, or uranium 235, may be applied as coatings for thermal neutron detection. Such materials may be applied as a compound, or with the addition of a binder material. For example, a polymer binder may be utilized to affix elementally pure enriched boron-10 to the cathode substrate. This form of coating compound may include an aluminum powder, for example, to provide a single coating that is both neutron-sensitive and conductive. Compounds such as B4C, BN, or B2O3 are examples of other boron compounds that could be applied as the neutron sensitive layer.

Certain example embodiments may utilize Uranium 235 in the neutron sensitive coating. This material may be applied as an oxide (U3O8 or UO2) or may be combined with other additives for conductive properties. In certain example embodiments, boron or lithium compounds may provide certain advantages for portal monitors because their low atomic number provides good gamma radiation rejection.

According to certain example embodiments, a cathode substrate in a neutron detector tube may be made of a glass tube or elongated cylinder, with at least a portion of the glass tube interior surface metallized such that the metal coating extends to a first end of the tube, but stops short of a second end. The metallized surface may be at least partially coated with a neutron sensitive compound to form a cathode. A (conductive) metal cathode cap may then seal the first end by application of a metal-to-metal seal between the metal cap and the metallized surface. The second, non-metallized end may be sealed with a (non-conductive) glass anode cap by the application of a glass-to-glass seal between the non-metallized glass tube substrate and the anode cap. According to example embodiments of the invention, the anode wire may extend through the body of the glass tube from the first end to the second end, and may be mechanically affixed to, but electrically isolated, from the cathode cap by a non-conductive anchor.

According to example embodiments of the invention, various arrangements of materials and components for electrically separating the anode and cathode and for sealing the detector tube will now be described with reference to the accompanying figures.

FIG. 1 illustrates an example neutron detector tube 100, according to example embodiments of the invention. In an example embodiment, the neutron detector tube 100 may include a cathode tube 102 made from non-conductive material, such as glass. In other example embodiments, the cathode tube 102 made from hermetically compatible, non-conductive material such as plastic. The cathode tube may include a first portion 126 and a second portion 128. In an example embodiment, the cathode tube 102 may act as a substrate for a conductive layer 104 that may be selectively applied to the inner surface of the cathode tube 102 such that the conductive layer 102 extends to the first end portion 126, but not all the way to the second end portion 128 of the cathode tube 104. In an example embodiment, the conductive layer may have a thickness of less than approximately 25 microns. For example, there may be a non-conductive portion near the second end 128 such that the cathode tube 102 substrate is bare glass with no conductive layer 104 applied to the substrate. In certain embodiments of the invention, the conductive layer 104 may include a continuous metallized layer. In certain example embodiments, the metallized layer may include aluminum.

According to example embodiments of the invention, the conductive layer 102 may be at least partially coated with a cathode coating 106. In certain example embodiments, the cathode coating 106 may include a neutron sensitive material. In accordance with certain example embodiments of the invention, the cathode coating 106 may include boron-10. In certain example embodiments, the boron-10 cathode coating may contain approximately 0.25 to about 0.7 mg per square centimeter of boron-10. In other example embodiments of the invention, the cathode coating 106 may include lithium-6, gadolinium, or uranium 235. According to an example embodiment of the invention, the cathode coating 106 may also include a binder material to hold the cathode coating 106 together, and to allow it to adhere to the conductive layer 104. For example, a polymer material may be included in the binder. In certain example embodiments, the cathode coating 106 or the binder may include conductive material, such as aluminum powder, to create a conductive cathode coating 106. In such embodiments, the conductive cathode coating 106 may be applied directly to the glass cathode tube 102 substrate, replacing the conductive layer 102. In other example embodiments, the conductive cathode coating 106 may be applied to the conductive layer 102.

According to certain example embodiments, an anode wire 108 may extend through the center of the cathode tube 102, from near the first end portion 126, to near the second end portion 128. In accordance with an example embodiment of the invention, an anode cap 120 may hold, secure, or affix the anode wire 108 adjacent to the second end portion 128. In an example embodiment, a non-conductive anode wire anchor 110 may hold, secure, or affix the anode wire 108 adjacent to the first end portion 126. According to an example embodiment, the anode wire anchor 110 may be made from glass or ceramic, and may be attached or partially embedded in a conductive cathode cap 112 such that the anode wire 110 does not come in electrical contact with the cathode cap 112. In certain embodiments, the anode wire anchor 110, may be attached or partially embedded in the cathode cap 112 so that no seal is necessary to keep fill gas 114 within the neutron detector tube 100 from escaping the detector tube 100 at the interface between the cathode cap 112 and the anode wire anchor 110. According to an example embodiment, the first end of an anode wire 108 may be secured to an anode wire anchor 110 that may be securely affixed to the cathode cap 112. In an example embodiment, the cathode cap 112 may include a non-conductive connection to the anode wire anchor 110 or to the anode wire 108.

According to example embodiments of the invention, the cathode cap 112 may be made of a conductive material such as metal. In certain embodiments, the cathode cap 112 may be made from aluminum. According to an example embodiment of the invention, the cathode cap 112 may be attached to the first end portion 126 of the cathode tube 102 by inserting at least a portion of the cathode cap 112 body into the first end portion 126 of the cathode tube 102. For example, the cathode cap 112 may include a recessed portion or circular trench that may accept the first end portion 126 of the cathode tube 102. In an example embodiment, a first portion interface 115 may be formed between at least a portion of the cathode cap 112 and the conductive layer 104 on the inside surface of the cathode tube 102. In certain example embodiments of the invention, the cathode tube 102 may be sealed at the first portion 126 with the cathode cap 112. In an example embodiment, a first portion seal 116 may be used to seal the first portion interface 115. In certain example embodiments of the invention, the first portion seal 116 may be a metal-to-metal seal that electrically connects the conductive cathode cap 112 to the cathode tube conductive layer 104, while at the same time, providing a hermetic seal. In an example embodiment of the invention, the first portion 126 of the neutron detector tube 100 may be sealed with a conductive seal 116 at the first portion interface 115 between the cathode cap 112 and the conductive layer 104

According to other example embodiments of the invention, the cathode cap 112 may at least be partially made of a non-conductive material such as glass so that the first portion interface 115 may be sealed with a glass-to-glass seal (117) rather than a metal-to-metal seal 116. In this example embodiment, the conductive layer 104 may not extend to the end of the first portion 126, but may end (as shown in FIG. 1, before the conductive layer dotted line portion) so that an exposed glass portion of the cathode tube 102 may be sealed to a glass cathode cap 112 with a glass-to-glass seal (117). In certain example embodiments, an external electrical connection may be made to the conductive layer 104 by a conductive wire, bridge, or conductive via. For example, in certain embodiments, one or more conductors or conductive wires 134 may be in electrical contact with the conductive layer 104, and the wires 134 may extend through the cathode cap 112 to form a cathode electrode for electrical connection to external equipment. In an example embodiment, the glass cathode cap 112 may be made such that a gas-tight or hermetic seal is formed around the conductive wires 134 that extend through the cathode cap 112.

In another example embodiment, one or more conductive vias 136 may be in electrical contact with the conductive layer 104, and the vias 136 may extend through the cathode tube 102 to form a cathode electrode for electrical connection to external equipment. In an example embodiment, the vias 136 may be made such that a gas-tight or hermetic seal is formed at the interface where the vias 136 extend through the cathode tube 102.

According to example embodiments of the invention, sealing the first portion of the neutron detector tube 100 may include sealing the first portion interface 115 between the cathode cap 112 and a non-conductive portion of the cathode tube 102 with a glass-to-glass seal (117). In certain embodiments, at least a portion of the cathode cap 112 in contact with the first portion interface 115 comprises glass.

According to an example embodiment, the second end portion 128 of the cathode tube 128 may be sealed with an anode cap 120. In certain example embodiments of the invention, the anode cap 120 may be made from non-conductive material, such as glass or ceramic. In an example embodiment, the anode cap 120 may form a second portion interface 117 with the cathode tube 102 at the non-conductive portion 124 of the cathode tube 102. In an example embodiment, the anode cap 120 may include a trenched or recessed portion that may accept the second end portion 128 of the cathode tube 102 such that at least a portion of the anode cap 120 extends into the second end portion 128 of the cathode tube 102 to form the second portion interface 117. In an example embodiment, the anode cap 120 may be sealed to the cathode tube 102 at the second portion interface 117 by a second portion seal 118. In certain example embodiments, the second portion seal 118 may be a glass-to-glass seal. In other example embodiments, the second portion seal 118 may be a glass-to-ceramic seal, depending on the material used for the anode cap 120. According to example embodiments, sealing the second end portion 128 of the neutron detector 100 may include sealing the second portion interface 117 between the anode cap 120 and a non-conductive portion 124 of the cathode tube 102 with a glass seal 118.

According to an example embodiment of the invention, the anode cap 120 may provide a sealed anchor for the anode wire 108 at an anode wire/cap interface 122. In an example embodiment, the anode wire 108 may extend through the anode cap 120 to allow for an anode electrical connection 130 outside of the inner portion of the neutron detector tube 100. In an example embodiment, the anode cap 120 may also include a purge tube 132 that extends through the anode cap 120 and allows the inner portion of the neutron detector tube 100 to be evacuated or purged, and then filled with fill gas 114. The fill gas 114 may include argon, methane, and/or $CO_2$. After the neutron detector tube is purged and filled with fill gas 114, the purge tube 132 may be sealed to keep the fill gas 114 from escaping.

In an example embodiment of the invention, the second portion seal 118 (glass-to-glass) may be specified with a dielectric strength greater that about 200 volts/mil (7.6 volts/micron). In an example embodiment of the invention, the second portion seal 118 may be specified to be vacuum tight to about $1*10^{-9}$ standard cc/sec helium. In an example embodiment of the invention, the second portion seal 118 may be specified with a volume resistivity of about $10^{14}$ ohm*cm. In certain example embodiments of the invention, the first portion seal 116 (metal-to-metal) may be specified to be vacuum tight to about $1*10^{-9}$ standard cc/sec helium. In certain example embodiments of the invention, the first portion seal 116 may be specified to have a resistivity of less than about 100 ohm*cm. In other example embodiments of the invention, the first portion seal 116 may be specified to have a resistivity of less than about 10 ohm*cm. In certain example embodiments, the first portion seal 116 may be specified such that the bulk resistance of the first portion seal 116 creates no appreciable voltage drop when detector current passes through the conductive seal.

Figure 2:
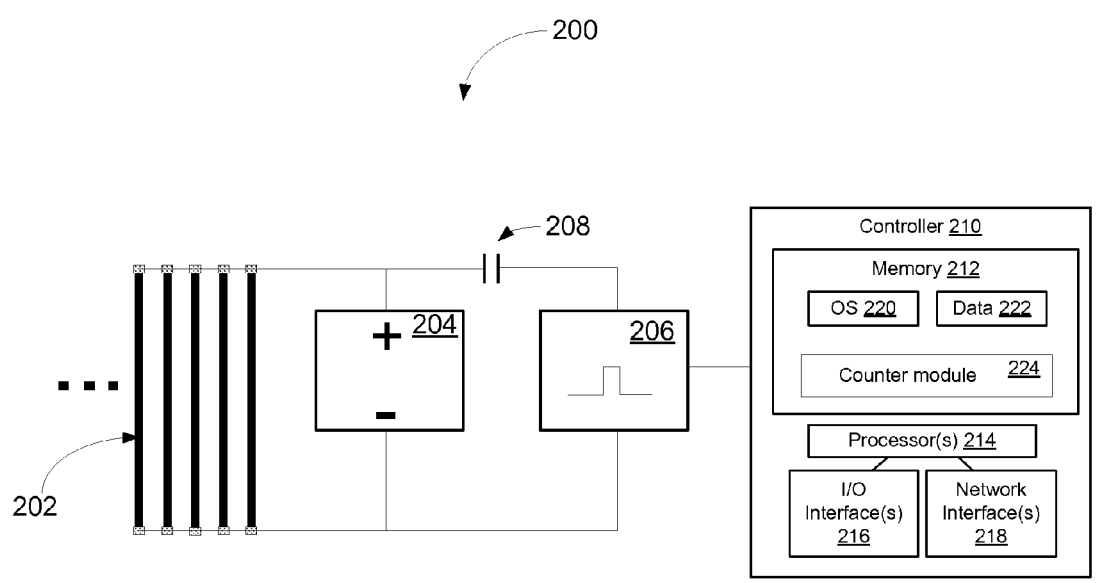
FIG. 2 is a block diagram of an illustrative neutron detector system according to an example embodiment of the invention.

FIG. 2 depicts an example neutron detector system 200, according to an example embodiment of the invention. In an example embodiment, the system 200 may include one or more detector tubes 202. In an example embodiment, the neutron detector tubes may be connected to a DC power supply 204. For example, the power supply may provide a direct current voltage potential between the anodes and cathodes associated with each of the detector tubes 202. In an example embodiment, the potential between the anode and cathode may be in the range of about 600 to about 1200 volts. In an example embodiment, one or more power supplies 204 may be utilized. In an example embodiment, the multiple detector tubes 202 in the array may be connected in parallel. In an example embodiment, a pulse detector 206 may receive and detect pulses from the one or more neutron detector tubes 202. In an example embodiment, the high voltage from the power supply 204 may be blocked, for example, buy one or more filter capacitors 208. In an example embodiment, the capacitor 208 may be utilized to pass transients, pulses, and alternating current signals, but not the DC voltage from the power supply 204.

According to an example embodiment of the invention, the pulse detector 206 may be in communication with a controller 210. The controller 210 may include a memory 212, one or more processors 214, and one or more input/output interfaces 216. In an example embodiment, the controller 210 may also include one or more network interfaces 218. According to an example embodiment, the memory 212 may include an operating system 220 and data 222. In an example embodiment of the invention the memory may also include a counter module 224 that may provide computer executable instructions to the one or more processors 214 for recognizing, counting, and/or further analyzing the pulses received from the pulse detector. In an example embodiment, the counter module 224 in conjunction with the input/output interface 216 or network interface 218 may provide an indication of the presence of free neutrons. In an example embodiment, the counter module 224 in conjunction with the input/output interface 216 or network interface 218 may provide an indication of the number of detected neutrons per unit time.

Figure 3:
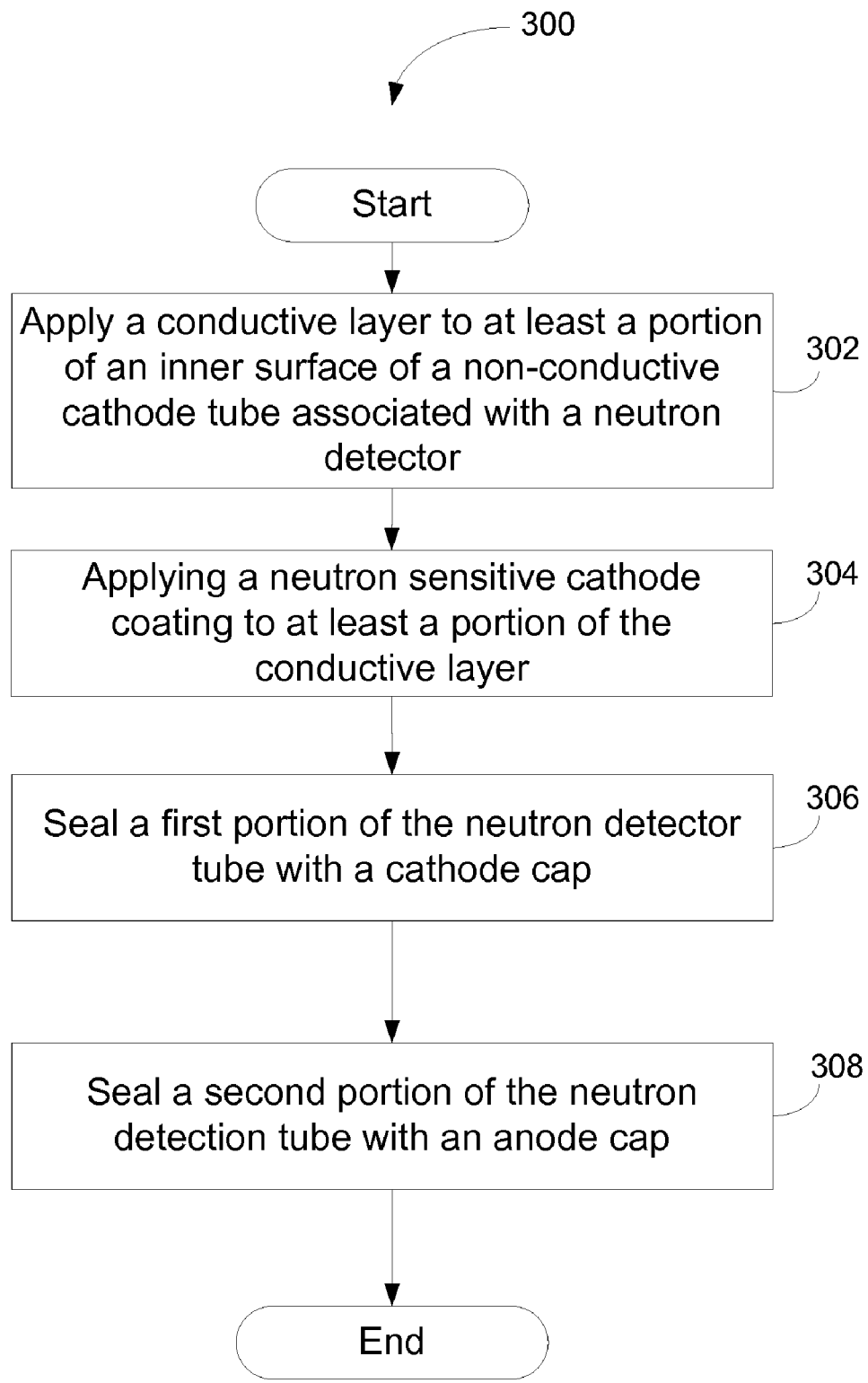
FIG. 3 is a flow diagram of an example method according to an example embodiment of the invention.

An example method 300 for providing a neutron detector tube will now be described with reference to the flowchart of FIG. 3. The method 300 starts in block 302, and according to an example embodiment, includes applying a conductive layer to at least a portion of an inner surface of a non-conductive cathode tube associated with the neutron detector. In block 304, and according to an example embodiment, the method 300 includes applying a neutron sensitive cathode coating to at least a portion of the conductive layer. In block 306, and according to an example embodiment, the method 300 includes sealing a first portion of the neutron detector tube with a cathode cap. In block 308, and according to an example embodiment, the method 300 includes sealing a second portion of the neutron detection tube with an anode cap. The method 300 ends after block 308.

Accordingly, example embodiments of the invention can provide the technical effects of creating certain systems, methods, and apparatus that can be utilized for detecting the presence of certain radioactive materials. Example embodiments of the invention can provide the further technical effects of providing systems, methods, and apparatus for sealing a neutron detector tube while providing electrical insulation between the anode and cathode. Example embodiments of the invention can provide the further technical effects of providing systems, methods, and apparatus for providing electrical conductivity to at least one electrode via a metal seal in contact with the cathode. Example embodiments of the invention can provide the further technical effects of providing systems, methods, and apparatus for providing electrical conductivity from the conductive layer to at least one external electrode via a metal bridge or conductor, while allowing both end interfaces to be sealed with glass-to-glass seals. Example embodiments of the invention can provide the further technical effects of providing systems, methods, and apparatus that may enable the use of glass-to-glass and/or metal-to-metal seals instead of costly ceramic to metal seals.

In example embodiments of the invention, the neutron detector system 200 may include any number of software applications that are executed to facilitate any of the operations. In example embodiments, one or more I/O interfaces may facilitate communication between the neutron detector system 200 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the neutron detector system 200. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the neutron detector system 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the neutron detector tube 100 and the neutron detector system 200 with more or less of the components illustrated in FIGS. 1 and 2.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical among various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language The claimed invention is:

1. A method for providing a neutron detector tube, the method comprising:
   applying a conductive layer to at least a portion of an inner surface of a non-conductive cathode tube associated with a neutron detector, wherein the at least a portion of the inner surface extends to a first end of the tube and stops short of a second end;
   applying a neutron sensitive cathode coating to at least a portion of the conductive layer;
   sealing a first portion of the neutron detector tube with a cathode cap; and
   sealing a second portion of the neutron detection tube with a non-conductive anode cap, wherein sealing the second portion of the neutron detector tube comprises sealing a second portion interface between the non-conductive anode cap and a non-conductive portion of the cathode tube with a glass seal.

2. The method of claim 1, wherein sealing the first portion of the neutron detector tube comprises sealing a first portion interface between the cathode cap and the conductive layer with a conductive seal.

3. The method of claim 1, wherein sealing the first portion of the neutron detector tube comprises sealing a first portion interface between the cathode cap and a non-conductive portion of the cathode tube with a glass seal, wherein at least a portion of the cathode cap in contact with the first portion interface comprises glass, and at least a portion of the cathode cap is in electrical communication with the conductive layer.

4. The method of claim 1, wherein applying the conductive layer comprises applying a neutron sensitive coating.

5. The method of claim 1, further comprising securing a first end of an anode wire to an anode wire anchor, wherein the anode wire anchor is securely affixed to the cathode cap, and wherein the cathode cap comprises a non-conductive connection to the anode wire anchor or anode wire.

6. The method of claim 1, wherein applying the conductive layer comprises applying an aluminum metallization layer to at least a portion of the inner surface of the non-conductive cathode tube.

7. The method of claim 1, wherein the non-conductive anode cap comprises at least one of glass or ceramic.

8. A system comprising:
   a power supply;
   a pulse detector; and
   at least one neutron detector tube, each of said at least one neutron detector tube comprising:
      a cathode tube comprising:
         a non-conductive body portion with an inner surface;
         a conductive layer on at least a portion of the inner surface, wherein the at least a portion of the inner surface extends to a first end of the tube and stops short of a second end; and
         a neutron sensitive cathode coating in electrical communication with the conductive layer;
      a cathode cap to seal a first portion of the neutron detector tube; and
      a non-conductive anode cap in communication with the non-conductive body portion of the cathode tube to seal a second portion of the neutron detector tube, wherein a glass seal seals second portion interface between the non-conductive anode cap and the non-conductive body portion of the cathode tube.

9. The system of claim 8, wherein a conductive seal seals a first portion interface between the cathode cap and the conductive layer, and at least a portion of the cathode cap is in electrical communication with the conductive layer.

10. The system of claim 8, wherein a glass seal seals a first portion interface between the cathode cap and a non-conductive portion of the cathode tube, wherein at least a portion of the cathode cap in contact with the first portion interface comprises glass.

11. The system of claim 8, wherein the cathode coating comprises a boron material.

12. The system of claim 8, further comprising an anode wire secured to an anode wire anchor, wherein the anode wire anchor is securely affixed to the cathode cap, wherein the cathode cap comprises a non-conductive connection to the anode wire anchor or anode wire.

13. The system of claim 8, wherein the conductive layer comprises one or more of an aluminum metallization layer or a neutron sensitive material.

14. The system of claim 8, wherein the wherein the cathode tube comprises glass or plastic.

15. The system of claim 8, wherein the non-conductive anode cap comprises at least one of glass or ceramic.

16. A neutron detector tube comprising:
   a cathode tube comprising:
      a non-conductive body portion with an inner surface;
      a conductive layer on at least a portion of the inner surface, wherein the at least a portion of the inner surface extends to a first end of the tube and stops short of a second end; and
      a neutron sensitive cathode coating in electrical communication with the conductive layer;
   a cathode cap to seal a first portion of the neutron detector tube; and
   a non-conductive anode cap in communication with the non-conductive body portion of the cathode tube to seal a second portion of the neutron detector tube, wherein a glass seal seals a second portion interface between the non-conductive anode cap and the non-conductive portion of the cathode tube.

17. The neutron detector tube of claim 16, wherein a conductive seal seals a first portion interface between the cathode cap and the conductive layer, and at least a portion of the cathode cap is in electrical communication with the conductive layer.

18. The neutron detector of claim 16, wherein a glass seal seals a first portion interface between the cathode cap and a non-conductive portion of the cathode tube, wherein at least a portion of the cathode cap in contact with the first portion interface comprises glass.

19. The neutron detector of claim 16, further comprising an anode wire secured to an anode wire anchor, wherein the anode wire anchor is securely affixed to the cathode cap, and wherein the cathode cap comprises a non-conductive connection to the anode wire anchor or anode wire.

20. The neutron detector tube of claim 16, wherein the non-conductive anode cap comprises at least one of glass or ceramic.

* * * * *